2,231,575

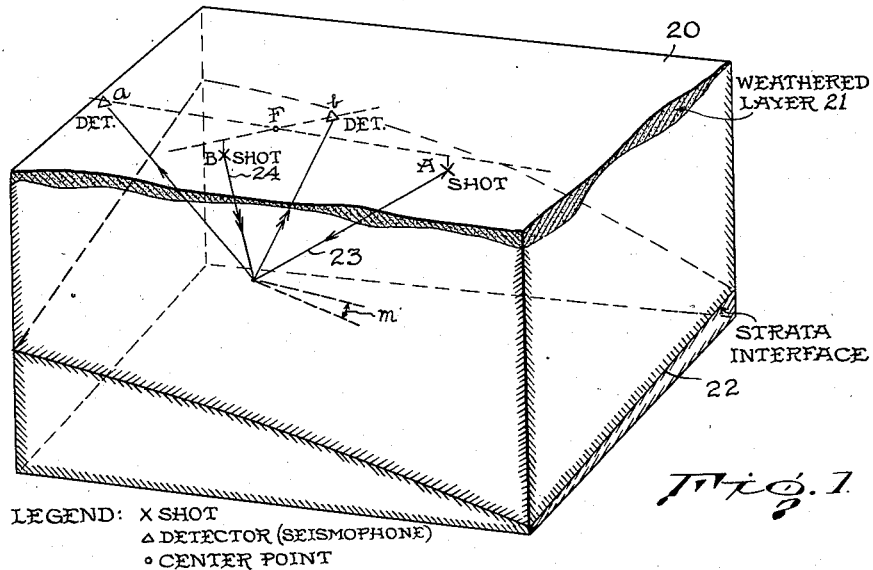
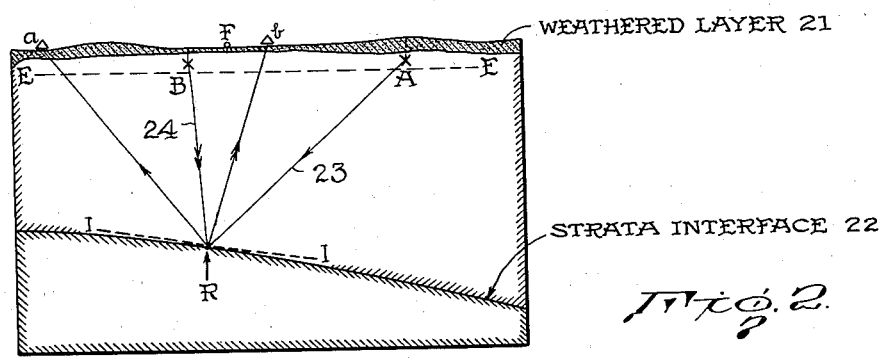
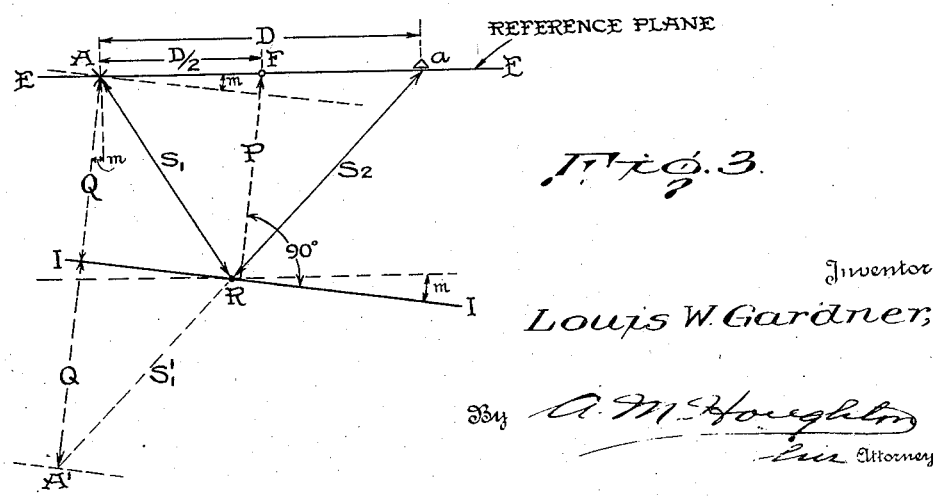

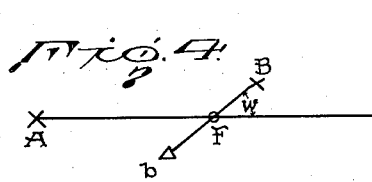
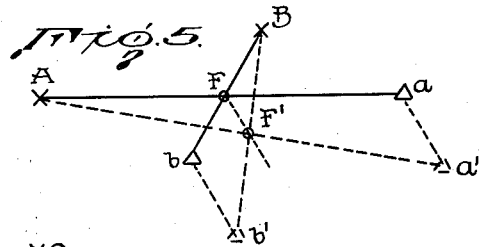
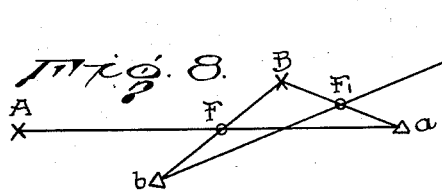
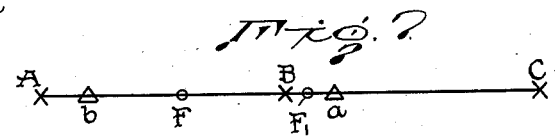
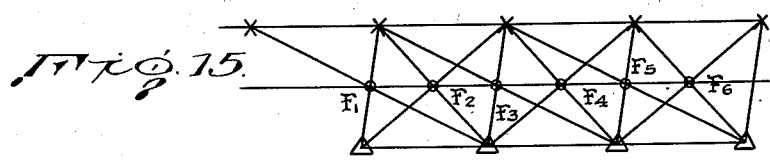
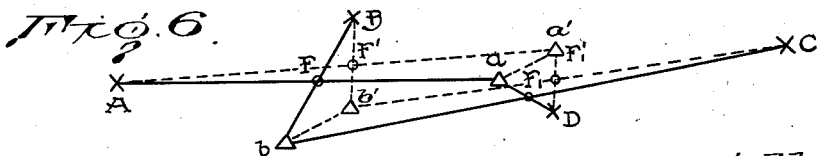
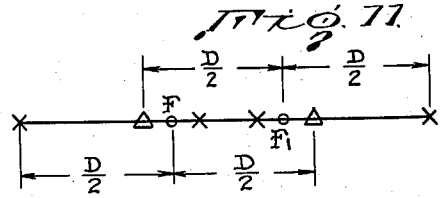
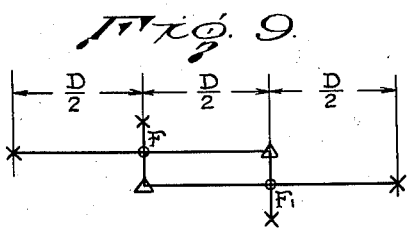
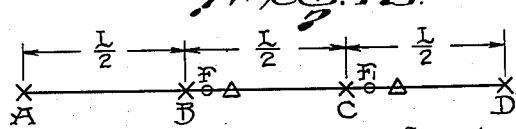
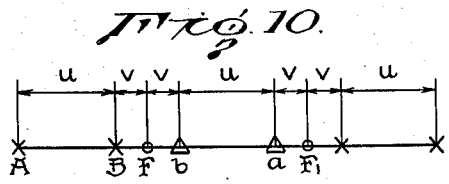
Inventor
Louis W. Gardner Feb. 11, 1941.    L. W. GARDNER    2,231,575
SEISMOGRAPH PROSPECTING
Filed Nov. 20, 1939    3 Sheets-Sheet 3
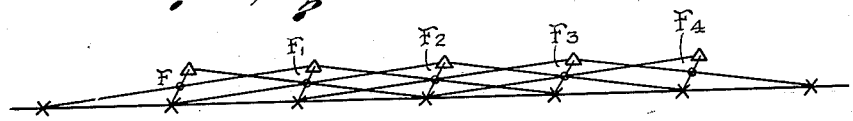
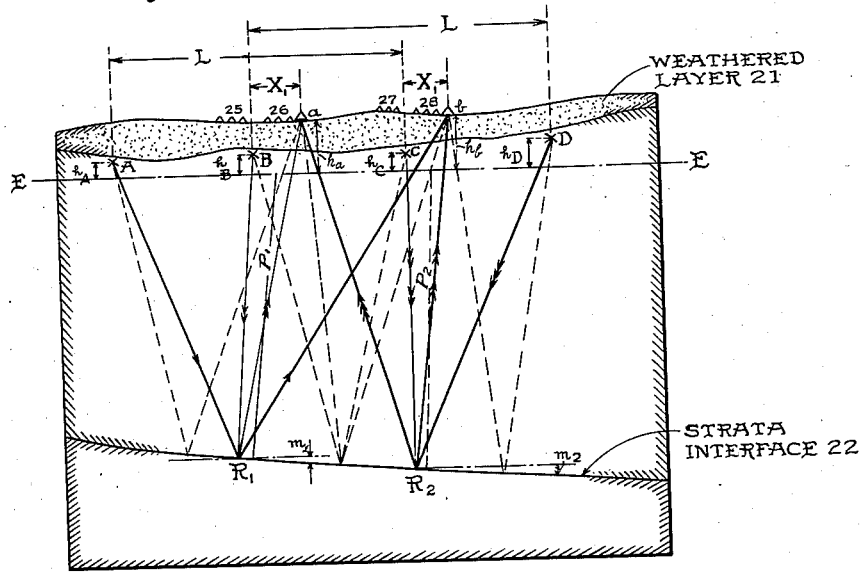
Inventor
Louis W. Gardner,
By A. M. Houghton
His Attorney Patented Feb. 11, 1941

UNITED STATES PATENT OFFICE 2,231,575

SEISMOGRAPH PROSPECTING

Louis W. Gardner, Pittsburgh, Pa., assignor to Gulf Research & Development Company, Pittsburgh, Pa., a corporation of Delaware Application November 20, 1939, Serial No. 305,378

11 Claims. (Cl. 181—0.5)

This invention or discovery relates to improvements in seismograph prospecting; and it comprises an improved method of determining seismic wave velocities in reflection seismograph prospecting in which dip and curvature of subterranean strata and the perturbing effect of weathered layers are corrected for, wherein a unit operation is carried out comprising the steps of firing a shot and receiving reflected seismic waves at one or more seismophones spaced from the shot, a second similar unit operation is carried out with a shot-seismophone spacing different from the first and with the center point of the line joining the second shot and seismophone coincident with the center point of the line joining the first shot and seismophone, and at least one additional pair of unit operations is carried out with the seismophones thereof in the same positions as seismophones of the first and second unit operations and so related to each other as to define a second center point common to two unit operations; whereby data are obtained from which seismic wave velocity can be determined with elimination of the effects of strata dip and weathering; and it further comprises apparatus organizations useful for the performance of the method; all as more fully hereinafter set forth and as claimed.

Among the objects of the present invention is the provision of a method of determining average seismic wave velocity in a region under investigation, which makes use of ordinary reflection prospecting equipment but yields values of precision comparable to those obtained in velocity measurements in wells, and in which the perturbing effect on velocity measurements of dip or curvature of subterranean strata can be and are minimized and accounted for, and perturbations due to the presence of weathered layers adjacent the surface of the earth, can be and are nullified so that the computed velocities are accurate.

Seismograph prospecting is carried out for the determination of subsurface tectonics, that is the arrangement of buried rocks, usually with a view to locating geological structures likely to contain oil. Thus in the case of sedimentary rocks it is desired to locate the depths of various important strata and their dip (inclination with respect to horizontal), curvature and faultings. In connection with seismograph prospecting procedures it is required to know as accurately as possible the average velocity of seismic waves in the earth, in the region under investigation, as the accuracy of most of the measurements depends ultimately on a correct knowledge of such velocity. An accuracy of the order of 1 or 2 per cent or better is desirable. The most direct way to determine velocity is to make use of wells. Seismic detectors are lowered to various depths in a well and the time is measured for waves to reach the detectors from shot points near the top of the well. Velocity values obtained in this way are very accurate. Unfortunately wells are often not available in regions under study. In default of available wells, an expedient which has sometimes been used is the so-called $T^2$—$D^2$ method. A shot is fired at a known distance from a spaced group of detectors and the squares of the travel times, T, for the reflected seismic waves reaching the detectors from some subterranean stratum interface are plotted on paper against the squares of the corersponding shot to detector distances as measured along the surface of the earth. The slope of the line drawn through these plotted points furnishes a measure of average wave velocity in the region under study. The values obtained by this procedure are seriously affected by dip or curvature of the stratum from which reflection occurred. The method does not take such departure from horizontality into account. Furthermore the values are profoundly affected by the depth and characteristics of the so-called weathered layer of the earth. The uppermost layers of rock or soil are subject to disintegration by weathering and have a much lower characteristic velocity than the more compact, unweathered layers below. The weathered layer is usually from zero to 200 feet thick. In the ordinary $T^2$—$D^2$ method errors due to the presence of this layer enter into the computed velocities. The effect of the weathered layer can be eliminated by burying both the shots and the seismophones below the weathered layer; but this is ordinarily quite impracticable, as regards the detectors, because of the great amount of drilling which would be required.

All in all, an accuracy of about 10 per cent is all that can be expected, under ordinary conditions, for velocity measurements made by these procedures, and in irregular terrain the accuracy is sometimes much poorer.

According to the present invention there is provided an improved method for obtaining the characteristic average seismic wave velocity in a region under study, which requires only ordinary reflection prospecting equipment but which gives values of accuracy comparable to those obtained with wells; and this even in regions where weathered-layer perturbations, and departure from horizontality of the buried strata, are of large magnitude. My method is made up of a plurality of pairs of unit operations, or reflection spans, interrelated in a particular geometrical system, in such manner that the effect of weathering enters in opposite relation in each pair of spans and is effectively canceled between two pairs of spans. Each unit operation involves firing a shot in the earth, and detecting and recording waves from the shot after reflection thereof from subterranean strata at a seismophone located a spaced distance from the shot. In the first step, a pair of such spans are shot, with different shot-seismophone spacings for the two spans, and arranged with a bisecting relation, that is, the center of the line joining the first shot and detector lies at the center of the line joining the second shot and detector. One of the spans is made as long as is conveniently practicable and the other as short, so that in the long span the path of the reflected waves is quite oblique and in the short span it is nearly vertical. Detected waves are amplified and recorded in known ways. With this common center point arrangement waves from each shot impinge on the reflecting stratum at substantially the same spot, and velocity values practically free from error due to dip or curvature of the reflecting strata can be determined from the records. The velocity determinations are however subject to weathering errors and in the second step the effect of the weathered layer is taken into account by shooting an additional pair of long-and-short spans; shot in such relation that the two seismophone positions for the second pair of spans are common with the two seismophone positions of the first pair of spans. The pairs of spans can be arranged in a variety of geometrical configurations satisfying the aforesaid principles. By appropriate computation from the records velocity values can be obtained which are very nearly as precise as those which would be obtained in a hypothetical region having no weathered layer and having strictly horizontal stratification.

In the accompanying drawings there are illustrated in a schematic or diagrammatic manner several ways of carrying out methods within the purview of the invention, and suitable apparatus organizations. In the drawings—

Fig. 1 is a perspective block diagram of the earth showing a pair of reflection spans set up, illustrative of the first stage of my method, Fig. 2 is a vertical sectional view corresponding to Fig. 1, Fig. 3 is a construction diagram to illustrate the manner in which dip is taken into account mathematically in the setups of Figs. 1 and 2, Fig. 4 is a diagrammatic plan view of the shot-detector arrangement of Figs. 1 and 2, Fig. 5 is a view similar to Fig. 4 showing the provision of auxiliary detectors in the arrangement of Fig. 4, Figs. 6 to 12 are diagrammatic plan views showing how two pairs of spans are linked together for elimination of weathering correction in accordance with the invention, Fig. 13 is a diagrammatical vertical sectional view of the earth with the system of Fig. 12 in place, illustrative of the geometrical considerations involved, and Figs. 14 and 15 are diagrams illustrating the utilization of any desired number of inter-related spans in chain arrangements.

Referring to Figs. 1 to 5, Fig. 1 shows in perspective a block of the earth, with the surface shown at 20, a weathered layer of irregular depth at 21, and a deep stratum interface 22 capable of reflecting waves to give readily identifiable record traces. This interface is shown as having both dip and curvature. Ordinarily there will be many other strata interfaces, more or less parallel to the one shown; these are omitted for the sake of clarity.

A long span and a short span are shot, with coincident center points. Either can be shot first. Assuming the long span is to be shot first, a shot A is fired and waves, travelling by path 23 and impinging on the strata interface at a point R, are received at a seismophone $a$ and recorded in a way known per se. The spacing D between the shot and seismophone is made as great as is conveniently practicable and may be of the order of 4000 feet. A second span is shot, with a shot B and seismophone $b$, having its center point at F, the mid-point on the surface of the earth between A and $a$. The shot-seismophone spacing is made as short as is conveniently practicable, and is often 200 feet. In Fig. 1 and in subsequent drawings, shot points are represented conventionally as crosses, detectors (seismophones) as triangles and the center points as small circles.

The shots are advantageously located below the weathered layer, as shown, to eliminate weathering corrections for the shot points. The long span is advantageously, though not necessarily, laid out in the direction of the strike of the reflecting strata, if this direction is known. Often the strike of the subsurface strata is known approximately in the region under investigation. Dip is the angle of inclination of the plane of stratification with the horizontal plane. Strike is the direction of the line of intersection of the plane of stratification with the horizontal plane.

Referring to the first span, A$a$, the travel time T for the wave to reach the seismophone can be determined from the record. D is measured along the surface, and $m$, the slope is determined in a known way (see for example Blau Patent 2,148,422). The angle $m$ is idential with the dip of the strata for a span disposed parallel to the direction of dip; in other cases $m$ will be less than the dip angle and will be zero for a span disposed parallel to the strike. The desired quantity V (the average wave velocity), and the perpendicular distance P from the midpoint F to the reflecting horizon (Fig. 3) remain unknown. In the second span, a different T is obtained, but P is the same, which permits elimination of P and solution for V. The effect of dip is thus minimized in the velocity measurement.

The mathematical considerations involved are apparent from Fig. 3 which represents one of the spans of Figs. 1 and 2. In Fig. 3, the (irregular) surface of the earth is replaced, for convenience in computation, by an arbitrary horizontal reference plane EE, advantageously chosen to pass through or below the lowest seismophone or shot location so that all elevations will be positive with respect to it. The stratum interface is replaced by a plane II, tangent to the strata interface at the common point of impingement R. The wave path from A to $a$ is as shown. The distance from A to R is denoted $S_1$, the distance from R to $a$ is denoted $S_2$, and the distance from F to II is denoted P. For convenience in calculation the geometrical image of the shot A as "reflected" in surface II is used in computing the wave path and is denoted A'. The actual path ARa is idential in length with the equivalent path A'Ra. Distance $S_1' = S_1$. The slope of the strata interface, in the plane ARa, is denoted $m$. By the law of cosines, $$(A'Ra)^2 = (VT)^2 = D^2 + (2Q)^2 + 4QD \sin m$$

wherein V, as stated, is the average velocity of the wave and T is its total travel time along the path ARa.

But $Q = P - (D \sin m)/2$, therefore $$V^2 T^2 = 4P^2 - D^2 \sin^2 m + D^2$$

or $$T^2 = (2P/V)^2 + (D \cos m/V)^2 \qquad (1)$$

In this equation, T, D, and $m$ are known; P and V are unknown. In the second span, a different value of T is found (by virtue of the different shot-seismophone spacing) hence two simultaneously equations are obtained:

$$T^2 = (2P/V)^2 + (D \cos m/V)^2$$
for the first span (1)

and $$T'^2 = (2P/V)^2 + (D' \cos m'/V)^2$$
for the second span (2)

These equations can now be solved simultaneously to eliminate P, and V expressed in terms of known quantities.

The two spans Aa and Bb can be at any desired angle $w$ (Fig. 4) with respect to each other. If desired they can lie along the same straight line ($w = 0$) in which case only one component of dip need be known. Fig. 5 shows the steps of shooting auxiliary spans for each of the spans of the elementary set-up of Fig. 4. The auxiliary spans Aa' and Bb' are created by adding auxiliary seismophone locations a' and b' spaced similarly and in the same direction from original seismophones a and b. With such arrangement, spans Aa' and Bb' have a common center point F', displaced from F in the direction of the displacement of seismophones a' and b', by a distance one-half the displacement distance of a' and b'; all as shown in Fig. 5.

According to the invention, to eliminate weathering error, at least one additional pair of spans is shot in any of various arrangements as indicated in Figs. 6 to 15, following the general principle of shooting additional pairs of spans with at least two seismophones in common with the original pair of spans (Aa and Bb) whereby weathering perturbations enter in opposite sense into both setups and tend to cancel out substantially completely. In some of the systems, one shot location is also common to two spans.

Referring to Fig. 6, a first span Aa and a second span Bb, having common center points F may be regarded as the basic pair of spans. A second pair of spans Da and Cb, having common center point F, have seismophone locations common with the seismophone locations for the first pair of spans. In this arrangement, through the provision of the second pair of spans and their arrangement with respect to the first pair the weathering errors are made to cancel. Fig. 6 also shows in dotted lines how one pair of auxiliary seismophones a' and b' may be added as described in connection with Fig. 5. The added seismophones create new center points F' and F₁'. As many pairs of auxiliary seismophones as desired may be added provided they are placed with respect to detectors a and b at substantially the same distance and in substantially the same direction. Each pair of auxiliary seismophones so located provides a complete set of auxiliary spans in which weathering errors are made to cancel according to the invention.

If desired, the several spans can all be located along a single line, as indicated in Fig. 7, which simplifies the field routine as well as the computations.

Fig. 8 diagrams an arrangement like that of Fig. 6 except that one shot point is eliminated by making shot point B serve in both pairs of spans.

In Fig. 9 a rectangular arrangement is employed with equal spacing D/2.

Figs. 10, 11 and 12 show linear arrangements. In Fig. 10, the spacings $u$ are equal, and the spacings $v$ are equal. The arrangement of Fig. 12 is often advantageous in the field in that the shots are equally spaced. In routine operations those setups are generally most convenient which provide the shots and seismophones all arranged substantially on a straight line; e. g. such systems as those of Figs. 7, 10, 11 and 12. The Fig. 12 system is especially convenient in many respects and is at present considered the best embodiment of the invention.

Fig. 13 is a vertical sectional view of the earth corresponding to the plan view of Fig. 12, and illustrates in detail how weathering is taken into account. In Figs. 12 and 13 the shots are equidistant and the detectors are spaced equal distances from the inner shots. As stated, the shots are located below the weathered layer to avoid the necessity of making shot-point weathering corrections. A suitable reference plane EE is arbitrarily chosen to pass near the surface of the ground, but usually below the level of the shots. It is necessary to know the relative elevation of each shot point ($h_A$, $h_B$, etc.) above this plane. At the seismophone locations the elevation and weathering corrections are measured by known methods. Since there is invariably a slight error in weathering determinations, the following equations include terms ($g_a$ and $g_b$) to account for any such errors. In Fig. 13, the two common or practically common points on the strata interface 22 near the feet of the perpendiculars $P_1$ and $P_2$, are denoted as $R_1$ and $R_2$, the slopes at the points are denoted as $m_1$ and $m_2$, the spacing AC, and BD, is denoted as L and the horizontal spacing Ba, and Cb is denoted as $X_1$. $P_1$ and $P_2$ correspond to P in Fig. 3. $T_{Ab}$ denotes reflection time corrected for weathering for a reflection path between A and b, reflection times for other reflection paths being similarly designated with different subscripts.

Equation 1 applied to the four principal wave paths (solid lines) shown in Fig. 13 yields the following equations:

$$\frac{4}{V^2}\left[P_1 + \frac{h_A + h_b}{2}\right]^2 + \left[\frac{(L + X_1) \cos m_1}{V}\right]^2 = (T_{Ab} - g_b)^2$$

$$\frac{4}{V^2}\left[P_1 + \frac{h_B + h_a}{2}\right]^2 + \left[\frac{(X_1 \cos m_1)}{V}\right]^2 = (T_{Ba} - g_a)^2$$

$$\frac{4}{V^2}\left[P_2 + \frac{h_D + h_a}{2}\right]^2 + \left[\frac{(L - X_1) \cos m_2}{V}\right]^2 = (T_{Da} - g_a)^2$$

$$\frac{4}{V^2}\left[P_2 + \frac{h_C + h_b}{2}\right]^2 + \left[\frac{X_1 \cos m_2}{V}\right]^2 = (T_{Cb} - g_b)^2$$

Adding the first and third equations, and subtracting the second and fourth yields:

$$\frac{4}{V^2}[P_2(h_D-h_C-h_b+h_a)-P_1(h_B-h_A-h_b+h_a)]+$$
$$\frac{1}{V^2}[(h_D-h_B)(2h_a+h_D+h_B)-(h_C-h_A)(2h_b+h_A+h_C)]+$$
$$\frac{L^2}{V^2}(\cos^2 m_1+\cos^2 m_2)+\frac{2LX_1}{V^2}(\cos^2 m_1-\cos^2 m_2)$$
$$=T_{Ab}^2-T_{Ba}^2+T_{Da}^2-T_{Cb}^2-2g_b(T_{Ab}-T_{Cb})-2g_a(T_{Da}-T_{Ba}) \quad (3)$$

Equation 3 above can be greatly simplified if the shot holes are drilled to such depths that $h_B-h_A=h_D-h_C$ (as can readily be done in practice). In this case the first term of the equation then becomes:

$$\frac{4}{V^2}(P_2-P_1)(h_D-h_C-h_b+h_a)$$

This term is generally very small compared with the third term and may be neglected. It is the product of two small differences. The second term becomes $$\frac{2}{V^2}(h_D-h_B)(h_D-h_C-h_b+h_a)$$

which likewise may be neglected because it is the product of two small differences.

If shot elevations are arranged so that $h_D-h_C$ is equal to $h_B-h_A$ as above, and also equal to $h_b-h_a$, as can often be done in field routine, the first two terms equal zero. This condition can be closely approached by controlling shot and detector depths if setup locations are chosen where the ground surface is approximately flat or where a uniformly sloping line can be laid out on the surface. This is often quite feasible in practice.

The last two terms of Equation 3 are products of small time differences and may be neglected. Thus the equation can be simplified as follows for a very close approximation:

$$V^2=\frac{L^2(\cos^2 m_1+\cos^2 m_2)+2LX_1(\cos^2 m_1-\cos^2 m_2)}{T_{Ab}^2-T_{Ba}^2+T_{Da}^2-T_{Cb}^2} \quad (3a)$$

Often, $m_1$ and $m_2$ are nearly the same so that the second term of the numerator of Equation 3a may be neglected. If $m_1$ and $m_2$ are both very near zero, as often happens in practice (horizontal stratification), the $\cos^2$ terms in the numerator approach unity, and the numerator can be called $2L^2$ without destroying the accuracy of the measurements. In practice the approximate direction of dip and strike of the strata is sometimes known in advance. In this case the line ABCD may advantageously be laid out along the direction of strike, so that the values of $m_1$ and $m_2$ are very small, and the equation may conveniently be simplified as above. In case the terms neglected above are not negligibly small in any particular application of the method, Equation 3 may be used.

The mathematics above apply to Fig. 12 or Fig. 13, but do not apply to all the figures. The mathematics for each case in practice is worked out separately. The results are very similar in each case, so that it is not necessary to demonstrate each one. The important feature is that the weathering error terms drop out because the same errors enter in opposite relation in overlapping systems. Slope and curvature effects are completely accounted for in Equation 3a, and are small in this system as compared with other possible systems which do not embody the principles of the invention. Terms involving differences of elevations of shots and detectors usually appear, but can generally be made to cancel out by properly adjusting shot and seimophone elevations, or in lieu of this can be accounted for mathematically.

Referring to Figs. 12 and 13, additional seismophones may be provided, besides the essential minimum (a and b), as indicated in groups at 25, 26, 27 and 28, on both sides of B and C, following the principles described in connection with Fig. 5. Each pair of seismophones determines a value of velocity. All such values can be combined to give a weighted average value of highest precision.

If speed in the earth is variable with depth, as usually happens in practice, Equation 3a above is modified somewhat, but remains approximately true. Actually, the waves are known to take slightly curved paths when variable velocity occurs. It has been shown in theory and in practice that the travel time along oblique paths is slightly reduced when the velocity increases with depth. Under ordinary conditions velocity increases with depth enough to make the computed average velocity approximately 0.5 to 2 per cent too high, increasing with depth. Accordingly, a more correct value for V in most practical cases will be about 99 per cent of the value indicated by the above method of computation, for depths less than 7000 feet and 98 per cent for depths greater than 7000 feet.

The precision of the method of Fig. 13 increases with L. Therefore it is desirable to make L as large as possible. The largest distance L that can be used is a distance limited by the requirement that reflection events shall be successfully recorded at a distance $L+X_1$. This limits the maximum value of $L+X_1$. L can be made largest within this limitation by keeping $X_1$ relatively small. Therefore, it is desirable to locate seismophones relatively near the two inner shot points. Similarly in other setups it is desirable to have one of the shot-detector spans of each $T^2-D^2$ unit much longer than the other.

In actual practice it is desirable to record more data than are essential to the method as described. For example, the four dotted-line paths of Fig. 13 may also be studied. The advantage of this is that the additional data obtained can be used in making dip determinations, and in correlating reflections. As in ordinary reflection shooting there may be many reflections, from plural strata, received on each record and the certainty of making proper correlations between records is greater when these data are available. Velocity values can be obtained for any and all relecting horizons which give reflections that can be correlated on the records.

Figs. 14 and 15 show how an indefinitely large plurality of spans can be shot, chainwise, according to the principles of the invention. In Fig. 14 the spans are combined as a recurrent chain with successive common center points F, $F_1$, $F_2$, etc. Fig. 15 shows an arrangement like that of Fig. 14, except that different wave paths have been drawn. In other words, the actual field setup of Fig. 15 is like that of Fig. 14, but the data obtained therefrom are handled differently. All the wave paths of Figs. 14 and 15 could, of course, be employed in one setup if desired.

The field procedure varies according to the setup selected and the amount of information already available on the area being studied. In general, the shots and detectors are laid out according to definite arrangements such as are shown in the figures. None of the elements deviates far from a straight line. The line is advantageous along the direction of strike of the reflecting strata if this is known in advance. It is best situated where the slope of the surface of the earth conforms as closely as possible with the desired shot and detector elevations so that elevation terms can be eliminated from the computations with a minimum amount of drilling. Shot holes are drilled at intervals along the line, usually equally spaced or nearly so. They are drilled below the weathered layer, generally 50 to 200 feet deep. The shot or shot and seismophone elevations are advantageously adjusted so that the equations used in computation take one of the simpler forms, as has been explained. Usually the shots are spaced 1000 to 2500 feet apart. For each setup there is a minimum of two seismophones. Once the minimum number of seismophones is laid out, others may be added, as described above. They may be uniformly spaced or otherwise if desired, perhaps 200 feet apart, for example. Seismophones added for the purpose of obtaining several velocity values should be grouped about the original seismophone locations in identical sets. As stated, the corresponding seismophones of each set should be displaced equal distances in the same direction from the original detectors which they supplement to insure that the new center points which they create are true center points. Detectors may also be added in any other manner desired to measure dip, fill in control, or obtain other data by known methods. Each shot is normally fired individually. One satisfactorily recorded shot at each shot location is sufficient if enough recording equipment and detectors are available to record all the necessary waves from that shot at one time. Of course, extra recordings may be made as a check. Each detector in the velocity setup must receive waves from at least two shots at different distances.

A precision of 0.5 to 2 per cent is readily obtained by the method of the present invention under reasonably favorable conditions. In applying the method in regions where the formations are anisotropic, that is formations in which seismic waves travel with different velocities in vertical and horizontal directions, the anisotropy can be measured and appropriate corrections applied in a known manner. However, anisotropy is rare in oil-bearing regions which form the principal field of application of seismograph prospecting.

The source of seismic waves, seismophones and recording apparatus utilized have not been described in detail as they are, or can be, of any suitable conventional type. Shot means any source of seismic waves in the earth; usually an exploding charge of dynamite but sometimes a falling weight or electrical or mechanical vibrating devices, etc. The shot may take the form of separate charges of explosive fired simultaneously or consecutively in the same or adjacent shot holes.

What I claim is:

1. In seismograph prospecting, a method of determining average seismic wave velocities in stratified rock covered by a weathered layer with compensation for error due to non-horizontality of strata and error due to the weathered layer, which comprises the operations of setting up detectors at two positions laterally spaced from each other, firing a shot at a position relatively close to one detector position and firing another shot at a position relatively remote from the other detector position, said shot firing positions being so related to the detector positions that a line joining the first shot and first detector positions bisects and is bisected by a line joining the second shot and second detector positions at a common center point, firing at least one additional shot at a position in the earth such that a line joining the third shot and one of said detector positions is substantially longer than and bisects and is bisected by a line joining the other of said detector positions and one of the shot positions at a second common center point spaced from the first, and recording the seismic waves received at said detectors.

2. In seismograph prospecting, a method of determining average seismic wave velocities in stratified rock covered by a weathered layer with compensation for error due to non-horizontality of strata and error due to the weathered layer, which comprises the operations of setting up detectors at two positions laterally spaced from each other, firing a shot at a position relatively close to one detector position and firing another shot at a position relatively remote from the other detector position, said shot firing positions being so related to the detector positions that a line joining the first shot and first detector positions bisects and is bisected by a line joining the second shot and second detector positions at a common center point, firing an additional shot at a position in the earth such that a line joining the third shot and one of said detector positions is substantially longer than and bisects and is bisected by a line joining the other of said detector positions and one of the first two shot positions at a second common center point spaced from the first, and recording the seismic waves received at said detectors.

3. The method of claim 1 wherein the first-named remotely spaced shot and detector positions are spaced along the direction of strike of the subterranean strata.

4. In seismograph prospecting a method of determining average seismic wave velocities in stratified rock covered by a weathered layer with compensation for error due to non-horizontality of strata and error due to the weathered layer, which comprises firing a shot and receiving seismic waves at a position spaced relatively far from the shot position, firing another shot and receiving seismic waves at two positions lying along a line joining said first two positions and equally and relatively closely spaced on each side of the midpoint of said line, said second shot and receiving positions lying next the first receiving and shot positions respectively whereby seismic waves are received in an opposite direction from that of receipt at the first receiving position, and firing a third shot along said line, spaced from the midpoint of the first receiving position and second shot position, by a distance equal to the distance of the other receiving position from said midpoint, and recording seismic waves as received at all said receiving positions.

5. In seismograph prospecting, a method of determining average seismic wave velocities in stratified rock covered by a weathered layer with compensation for error due to non-horizontality of strata and error due to the weathered layer, which comprises the operations of setting up detectors at two positions laterally spaced from each other, firing a shot at a position relatively close to one detector position and firing another shot at a position relatively remote from the other detector position, said shot firing positions being so related to the detector positions that a line joining the first shot and first detector positions bisects and is bisected by a line joining the second shot and second detector positions at a common center point, firing two additional shots at positions in the earth respectively relatively close to and far away from said detector positions and such that a line joining one of the additional shots and one of said detector positions bisects and is bisected by a line joining the other additional shot and the other of said detector positions at a second common center point spaced from the first, and recording the seismic waves received at said detectors.

6. The method of claim 1 wherein the shot positions are spaced along a line and the receiving positions are spaced along a line parallel thereto.

7. The method of claim 1 comprising in addition to receiving waves at said two positions, receiving waves at at least two additional positions, one near one of said first receiving positions and the other an equal distance from the other of said first receiving positions, on parallel lines.

8. In seismograph prospecting a method of measuring average seismic wave velocities in stratified rock covered by a weathered layer with compensation for error due to non-horizontality of strata and error due to the weathered layer, which comprises firing four shots equally spaced along a substantially straight line, receiving waves at positions equally spaced from the two intermediate shot positions by distances less than one-half the shot spacing, and recording waves from said shots as received as said two receiving positions.

9. In apparatus for seismograph prospecting, in combination, a shot and a seismophone in the earth spaced relatively close to each other, a second shot and seismophone spaced relatively far apart, with the center point of the line joining the first shot and seismophone coincident with the center point of the line joining the second shot and seismophone, and an additional pair of shots so spaced with respect to the seismophones that the center point of the line joining one of the seismophones and one of said additional pair of shots, is coincident with the center point of the line joining the other of the seismophones and the other of said additional pair of shots.

10. In seismograph prospecting, the art of determining average seismic wave velocities which comprises generating seismic waves at a position in the earth and detecting reflected seismic waves at a position in the earth spaced from said wave-generation position, generating seismic waves at another position spaced from the first and detecting reflected waves at a point spaced from said second wave-generation position a distance different from that of the spacing between the first wave-generation and detecting positions, said wave-generation and detecting positions being so spaced that a line joining the first wave-generation and detecting positions bisects and is bisected by a line joining the second wave-generation and detecting positions; carrying out an additional similarly related pair of wave-generating and detecting operations, with detecting positions of the second pair common to detecting positions of the first pair, and recording all said detected waves, whereby record data are obtained from which average seismic wave velocity can be computed with elimination of the effects of weathered layers and of non-horizontality of strata.

11. A method of measuring seismic wave velocities in stratified rocks covered by a weathered surface layer which comprises setting up shots at two adjacent corners of an oblique parallelogram the length ratio of the diagonals of which is relatively large and detectors at the other two adjacent corners of the parallelogram, and setting up at least one additional shot at the corner of an oblique parallelogram the length ratio of the diagonals of which is relatively large with said detectors at two corners thereof and a shot at the third corner thereof, the long diagonals of the two parallelograms terminating at opposite ends of a line joining the two detectors, firing the shots, receiving seismic waves at the detectors and recording the detected waves.

LOUIS W. GARDNER.